(12) United States Patent
Finch

(10) Patent No.: US 10,743,528 B1
(45) Date of Patent: Aug. 18, 2020

(54) BAIT CONTAINER

(71) Applicant: Ricky Finch, Jamestown, NY (US)

(72) Inventor: Ricky Finch, Jamestown, NY (US)

(*) Notice: Subject to any disclaimer, the term of this patent is extended or adjusted under 35 U.S.C. 154(b) by 71 days.

(21) Appl. No.: 15/972,386

(22) Filed: May 7, 2018

(51) Int. Cl.
*A01K 97/04* (2006.01)

(52) U.S. Cl.
CPC ................................ *A01K 97/04* (2013.01)

(58) Field of Classification Search
CPC .......................... A01K 97/04; A01K 97/06
USPC .......... 362/154, 157, 235; 43/55, 17.5, 54.1; 206/315.11; 224/920; 215/228; 422/24; 220/263, 283
See application file for complete search history.

(56) References Cited

U.S. PATENT DOCUMENTS

| | | | | | |
|---|---|---|---|---|---|
| 77,215 | A * | 4/1868 | Reistle | ................. | A47G 19/22 220/710.5 |
| 4,462,180 | A | 7/1984 | Scott | | |
| 4,697,379 | A * | 10/1987 | McPhaul | ................. | A01K 97/06 206/315.11 |
| 4,927,047 | A * | 5/1990 | Stuber | ................. | B65D 81/3879 206/805 |
| 5,178,450 | A * | 1/1993 | Zelensky | ................. | A47G 19/30 362/101 |
| 5,311,413 | A * | 5/1994 | Farmer | ................. | F21V 33/008 362/154 |
| 5,732,851 | A * | 3/1998 | Griffin | ................. | B65D 25/2861 220/737 |
| D488,672 | S * | 4/2004 | Oas | ................. | D7/507 |
| 6,820,364 | B1 | 11/2004 | Tyson | | |
| 7,914,165 | B2 * | 3/2011 | Bertken | ................. | A47G 19/2227 362/101 |
| 9,821,937 | B2 * | 11/2017 | Staeben | ................. | F21V 33/004 |
| 2005/0007769 | A1 * | 1/2005 | Bonzer | ................. | F21L 4/08 362/157 |
| 2008/0025018 | A1 * | 1/2008 | Sandy | ................. | A47G 19/2227 362/157 |
| 2016/0021861 | A1 * | 1/2016 | Pippins | ................. | A01K 97/06 43/17.5 |

* cited by examiner

*Primary Examiner* — Darren W Ark
*Assistant Examiner* — Katelyn T Truong
(74) *Attorney, Agent, or Firm* — Sanchelima & Associates, P.A.; Christian Sanchelima; Jesus Sanchelima

(57) ABSTRACT

A portable bait container with adjustable luminosity has an openable casing to access a receptacle for storing baits. Casing is provided with a handle to conveniently carry and handle container from one place to another. Container further includes a first illuminating device that illuminates surrounding and hence enable user to easily view the ground and search for fishing baits such as worms or night-crawlers. Actuating switch is provided on handle for its easy access which actuates and de-actuates first illuminating device. Intensity of first illuminating device is controlled by using dimmer adjuster that enables user to manipulate intensity and hence provides maximum opportunity for collecting fishing baits. Container is portable, easy to handle by a single user to perform various bait collection operations and has adjustable luminosity for viewing surrounding at desired light intensity and thus reduces opportunity loss during collection of fishing baits.

14 Claims, 3 Drawing Sheets

BAIT CONTAINER

BACKGROUND OF THE INVENTION

1. Field of the Invention

The present invention relates to a bait container with adjustable luminosity and, more particularly, to a portable bait container with adjustable luminosity facilitating ease of collecting bait to sell to fishermen.

2. Description of the Related Art

Baits are required to entice fish during fishing. Various baits operations, such as searching, handling and storing of worms or night crawlers, are required to be performed for making baits available for fishing. Searching worms or night crawlers in dark region or during nighttime is difficult due to insufficient light. Generally, a torch is required to illuminate the area and then hunt for worms or night crawlers. However, illuminating the area is a skilful task because if the area is illuminated with more than desired intensity then worms or night crawlers are likely to penetrate deep inside the ground and thus cause opportunity loss. Also, performing various simultaneous operations such as holding of torch and a storage box, moving in search of worms or night crawlers, locating and picking them, handling storage box for storing worms or night crawlers by a single human being is difficult because of its limited two workable hands.

Several designs for bait containers have been designed in the past. None of them, however, include easy and convenient handling of bait containers by an individual user owing to light weight and ergonomic feature of bait containers and provide desired illumination to perform various bait operations.

Applicant believes that a related reference corresponds to U.S. Pat. No. 6,820,364 issued to Jeremy D. Tyson titled "Lighted bait container apparatus" disclose a container having removable flashlight. However, it differs from the present invention because the apparatus of U.S. Pat. No. 6,820,364 is inconvenient and difficult to handle and also because of removable flashlight the user can forget to carry or misplace flashlight during bait collection which can hamper desired use of apparatus. Other U.S. Pat. No. 4,462,180 issued to Kenneth Scott titled "Bait Container" includes housing for holding container(s) that holds fishing bait and water. However, it differs from the present invention because bait container of U.S. Pat. No. 4,462,180 is bulky and hence not handy to carry and also involves manufacturing difficulties and increased cost owing to greater number of elements.

Other documents describing the closest subject matter provide for a number of more or less complicated features that fail to solve the problem in an efficient and economical way. None of these patents suggest the novel features of the present invention.

SUMMARY OF THE INVENTION

In view of the above, it is an objective of the present invention to solve or at least reduce the problems discussed above. Container is portable, easy to handle and is provided with a feature of having adjustable luminosity. Container is provided with a casing having receptacle for storing baits and has a handle to conveniently carry and handle casing from one place to another. Container further includes a first illuminating device that illuminates surrounding and hence enable user to easily view the ground and search for fishing baits such as worms or night-crawlers. Actuating switch is provided on handle for its easy access which actuates and de-actuates first illuminating device. Intensity of first illuminating device is controlled by using dimmer adjuster that enables user to manipulate intensity and hence provides maximum opportunity for collecting fishing baits. Second illuminating device is provided in receptacle to illuminate receptacle to provide easy view to user. Power battery is provided to selectively power first illuminating device and optionally second illuminating device. Container is portable, easy to handle by a single user to perform various bait collection operations and has adjustable luminosity for viewing surrounding at desired light intensity and thus reduces opportunity loss during collection of fishing baits.

It is one of the main objects of the present invention to provide a container that is portable, easy to handle and has adjustable luminosity for viewing surrounding at desired light intensity and interior of container thus facilitating handling ease and reducing opportunity loss during collection of fishing baits.

It is another object of this invention to provide a portable and easy to handle container with adjustable luminosity that can be easily handled by a single user who can conveniently performs simultaneous bait collection operations.

It is still another object of the present invention to provide a portable and easy to handle container with adjustable luminosity that is easy to operate, light in weight, owes less components, simple to make and thus is overall cost effective.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
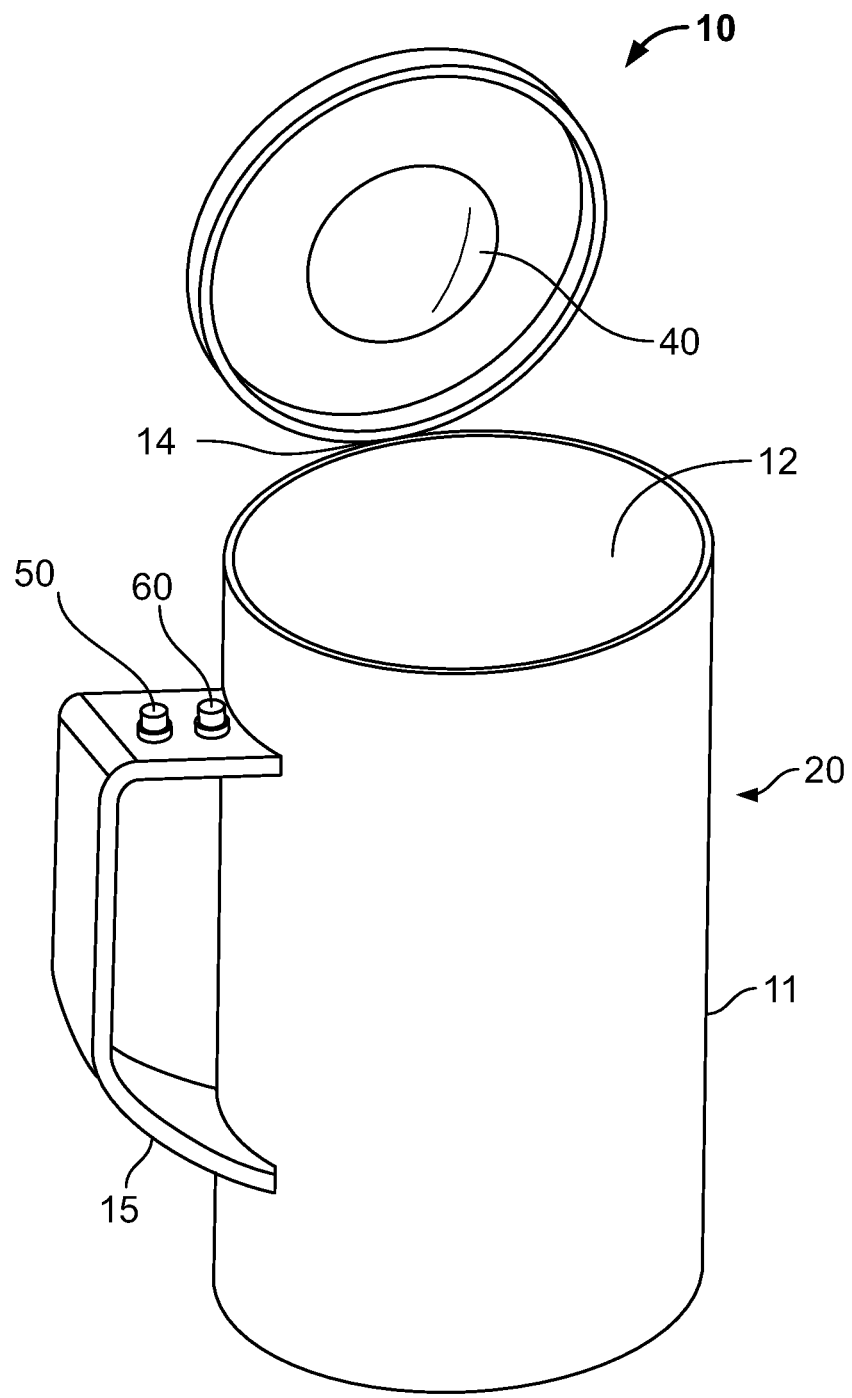
FIG. 1 represents a perspective view of a bait container with adjustable luminosity, in accordance with another embodiment of the present invention.
Figure 2:
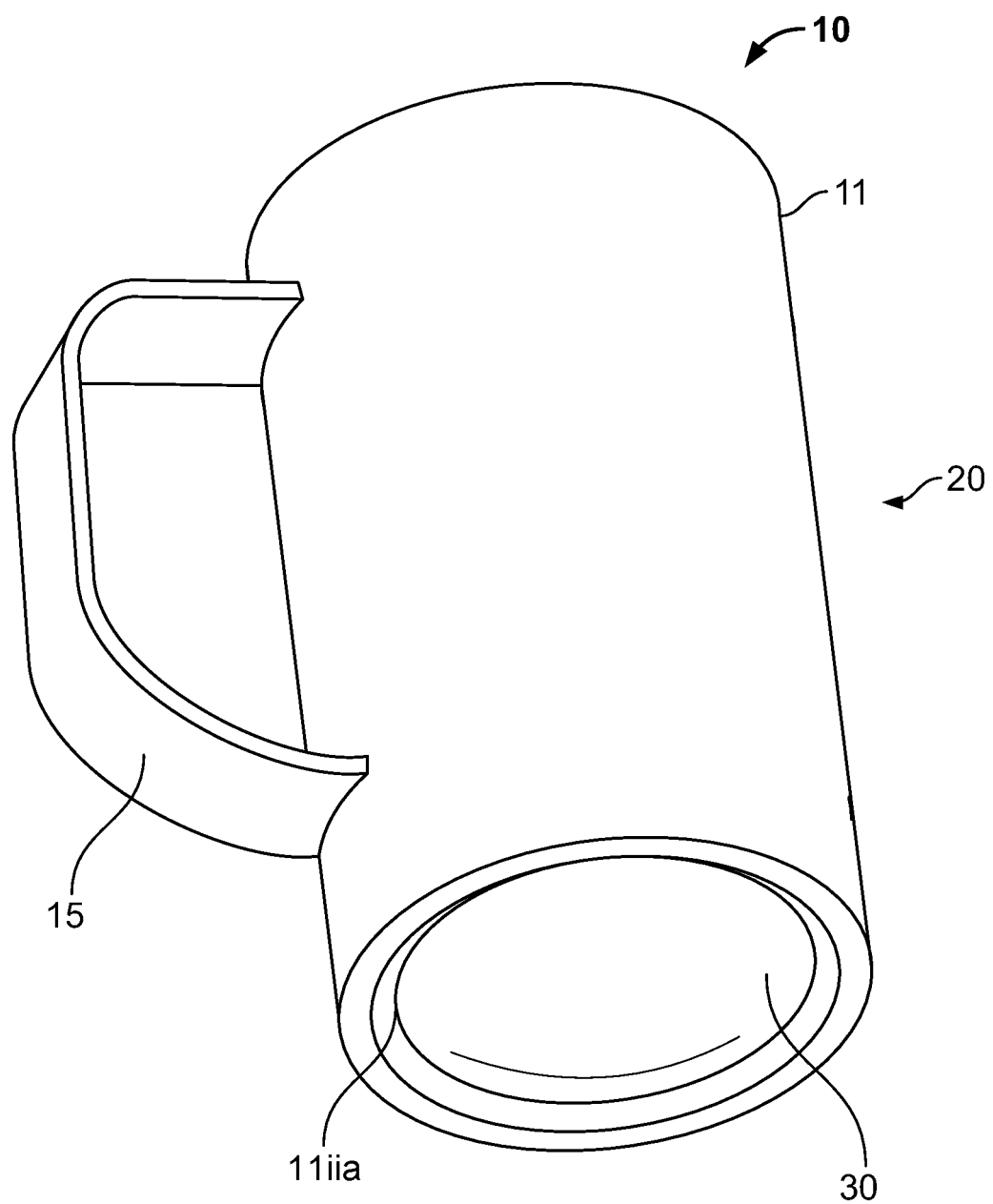
FIG. 2 shows a perspective bottom view of container of FIG. 1.
Figure 3:
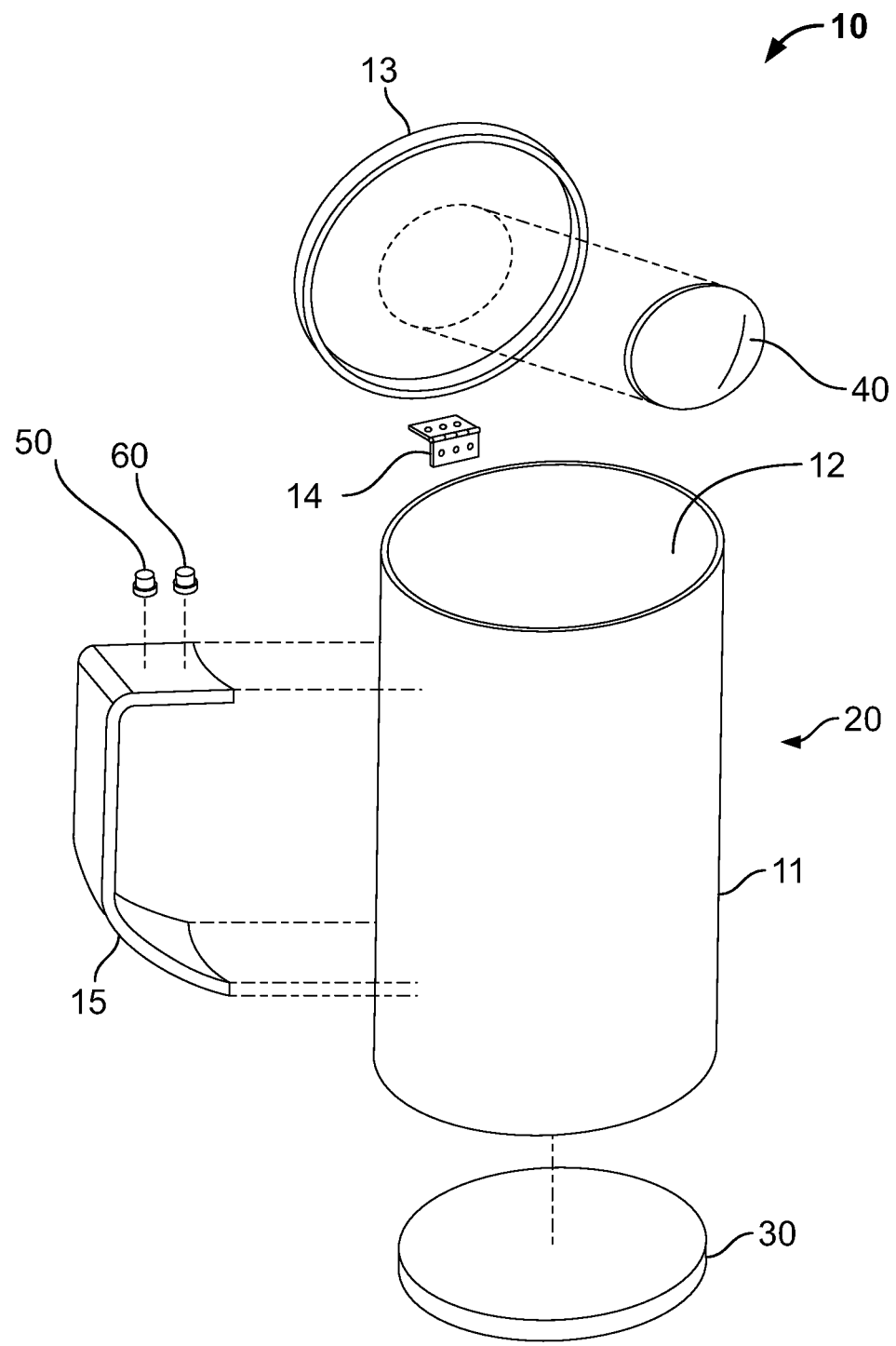
FIG. 3 illustrates an exploded view of container of FIG. 1.

In accordance with a second exemplary embodiment of the present disclosure as illustrated in FIGS. 1 to 3 and referred to with numeral 10, portable bait container with adjustable luminosity basically includes a casing 20, at least one first illuminating device 30, at least one second illuminating device 40, at least one actuating switch 50, a dimmer adjuster 60 and a power battery (not illustrated in Figures).

Casing 20 is a handy cup-like or bottle-like structure that includes a vessel 11 with a receptacle 12 and a cover 13 that is hingedly connected, by use of hinges 14 to vessel 11. Open configuration of cover 13 permits access to receptacle 12 to drop baits therewithin and remove baits therefrom. Closed configuration of cover 13 restricts access to receptacle 12 and the casing 20 acts as storage. Although, vessel 11 and cover 13 are connected by hinges 14, other connections are well within the scope of this invention that permits pivotal connection between vessel 11 and cover 13. Casing 20 can be of any desired shape, size, color and material. Use of plastic material for casing 20 is advantageous due to its light weight as compared to metallic materials. Casing 20 can also be provided with a non-integral locking element (not illustrated in Figures) such as a mechanical lock that enables cover 13 to get locked and unlocked with vessel 11 for achieving the closed configuration and the open configuration respectively. Alternatively, locking element can be an integral part of casing 20 such as threads configured on internal surface of cover 13 and external surface of vessel 11 that permits locking and un-locking. Locking element is selected in such a way that it is easy to manipulate by a single user or by a single hand of a single user.

A handle 15 is provided for easy lifting and hand-held transport/carrying of casing 20. Handle 15 has two edge portions provided on one planar surface of the casing 20 (as illustrated in FIGS. 5 to 7). Alternatively or additionally, handle 15 can be a belt that can be wound around such that two edge portions are provided on two oppositely disposed planar surface of the casing 20 (not illustrated in FIGS.). The belt can be flexible or rigid.

First illuminating device(s) 30 is fitted at the base 11iia of the vessel 11. When a user lifts vessel 11 handle 15, first illuminating device 30 (which in an operative luminiated configuration) illuminates surrounding and hence enable user to easily view the ground and search for fishing baits such as worms or night-crawlers. Though the present subject matter is described by providing first illuminating device 30 at the base 11iia, however the present subject matter is not limited by providing first illuminating device 30 only at the base 11iia, but can be provided on any other surfaces of vessel 11, cover 13 and/or handle 15 that can provide illumination to user at desired position/location.

One or more second illuminating device 40 is/are fitted on the inside surface of cover 13. Second illuminating device (s), in an operating configuration, illuminates the interior of casing 20 for user to easily view interior. Second illuminating devices 40 can be considered as an optional feature provided in casing 20.

Actuating switch(s) 50 can be provided anywhere on casing 20, however for description of the present invention, actuating switch 50 is provided on handle 15. Providing actuating switch 50 on handle 15 is advantageous as accessing of actuating switch 50 on handle 15 is easy. Actuating switch(s) 50 actuates first illuminating device 30 and optionally second illuminating device 40. In another case, second illuminating device 40 is actuated and de-actuated by another switch (not shown) such as sensor-based switches which actuates second illuminating device 40 in the open configuration of casing 20 and de-actuate in the closed configuration of casing 20.

Power battery (not illustrated in Figures) is provided anywhere on the vessel 11, cover 13 or handle 15. Power battery stores energy and supplies energy to first illuminating device(s) 30 and second illuminating devices 40 upon actuation of actuating switch(s) 50. Power battery can be a single battery which powers both first illuminating device(s) 30 and second illuminating devices 40 or are more than one battery that separately powers first illuminating device(s) 30 and second illuminating devices 40. Power battery can be replaceable when drained or can be charged by any energy such as electricity or solar.

Dimmer adjuster 60 is provided on casing 20. Typically, dimmer adjuster 60 is provided on handle 15 for easy access. Dimmer adjuster 60 enables increase and decrease of intensity of first illuminating device(s) 30. This feature is advantageous because intensity of light can be reduced in case light intensity is more and hence reduces chances of worms or night crawlers to penetrate inside the ground due to excess light and thereby reduce opportunity loss. Also, light intensity can be increased so that user gets desired illumination to clearly view the ground and search for worms or night crawlers.

The present invention discloses a method adopted by fisherman for searching, handling and storing fishing baits such as worms or night crawlers especially disposed in dark areas or at nighttime by using portable and ease to handle container with adjustable luminosity. Initially, user can conveniently lift container by using handle 15 and move from one place to another place. Based upon external surrounding conditions, user can actuate actuating switch 50 to switch on first illuminating device 30 and manipulate dimmer adjuster 60 so that desired light intensity of first illuminating device 30 can be achieved. User can then go for hunting baits such as worms or night crawlers with desired intensity light. Upon receipt of one or more worms or night crawlers, user can easily open casing 20 and introduce one or more worms or night crawlers therewithin. While opening container second illuminating device 40 gets actuated and hence enables user to search or manipulate items therewithin.

Thus, user can single handedly go for searching and storing fishing bait using various convenient feature of handling container (like lifting, carrying, opening and closing) and adjusting light intensity of first illuminating device 30 by use of dimmer adjuster 60. Due to convenience and ease of operation, kids can also handle container without any operational difficulties. Thus, container described herein is portable, easy to handle by a single user which can perform various bait collection operations (like searching, handling and storing) and has adjustable luminosity for viewing surrounding at desired light intensity and interior of container and reduces opportunity loss during collection of fishing baits. Bait container described herein has less components as compared with existing containers and thus is simple in manufacturing and economical.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:
1. A portable bait container, comprising:
    a casing having a base and further including a bottom surface on said base, said base having a first at least one illuminating member mounted thereon, said first at least one illuminating member adapted to illuminate the area below said bottom surface; said casing includes an interior space; said casing having a top side entirely open, said top side being coverable by a hinged lid, said hinged lid having an open and closed configuration; said hinged lid having a lid bottom surface that includes a second at least one illuminating member adapted to illuminate said casing interior space; said interior space adapted to receive bait, said casing further including a handle, said handle having an upper portion, said upper portion being flat and perpendicular to said casing, said handle having an on and off switch and a dimmer switch for said first and second at least one illuminating member, said on and off switch and said dimmer switch being mounted on said upper portion, said on and off switch and said dimmer switch being adjacent to each other; said hinged lid and said casing being flush when said hinged lid is in the closed configuration; said first at least one illuminating member being recessed within said casing and being mounted to said base, said base and said first at least one illuminating member being separate, said first and second at least one illuminating member being parallel to one another when said hinged lid is in the closed configuration, said first at least one illuminating member being entirely below said second at least one illuminating member when said hinged lid is in the closed configuration, said hinged lid being perpendicular to said upper portion of said handle when in the open configuration.

2. The portable bait container of claim 1 wherein said first at least one illuminating member extends along an entire circumference of said bottom surface and said first at least one illuminating member being flush with said base.

3. The portable bait container of claim 1 wherein said first at least one illuminating member is removable.

4. The portable bait container of claim 1 wherein said first at least one illuminating member is larger than said second at least one illuminating member.

5. The portable bait container of claim 1 wherein said second at least one illuminating member is centrally positioned on said lid bottom surface.

6. The portable bait container of claim 1 wherein said bait is worms.

7. The portable bait container of claim 1, wherein said on and off switch and said dimmer switch face away from said first at least one illuminating member.

8. The portable bait container of claim 1, wherein said first and second at least one illuminating members are of a same shape.

9. The portable bait container of claim 1, wherein said handle has a curved lower portion, said curved lower portion adapted for ergonomic and comfortable gripping of said handle.

10. The portable bait container of claim 1, wherein said first and second at least one illuminating members being perpendicular to each other when said hinged lid is the open configuration.

11. The portable bait container of claim 1, wherein said casing is cylindrical and said first and second at least one illuminating members being circular.

12. The portable bait container of claim 1, wherein an outer face of said hinged lid faces away from said handle in the open configuration.

13. The portable bait container of claim 1, wherein said handle has a middle portion, wherein said hinged lid and said middle portion each being in vertical planes which are parallel to each other when said hinged lid is in the open configuration.

14. The portable bait container of claim 13, wherein said lid bottom surface is perpendicular to said vertical plane of said middle portion of said handle when in the closed configuration.

* * * * *